(12) United States Patent
Ouellette

(10) Patent No.: US 6,632,067 B1
(45) Date of Patent: Oct. 14, 2003

(54) PALLET DISPENSER WITH QUICK PALLET SIZE CHANGE OVER

(75) Inventor: Joseph F. Ouellette, Glendale, MO (US)

(73) Assignee: Oullette Machinery Systems, Inc., Fenton, MO (US)

( * ) Notice: Subject to any disclaimer, the term of this patent is extended or adjusted under 35 U.S.C. 154(b) by 38 days.

(21) Appl. No.: 09/704,072

(22) Filed: Nov. 1, 2000

(51) Int. Cl.$^7$ .................................................. B65H 3/00
(52) U.S. Cl. ................ 414/798.1; 414/788; 414/797.5; 414/797.9
(58) Field of Search .............................. 414/788, 788.1, 414/788.9, 798.1, 797.9, 797.4, 797.5, 794.4, 707, 933

(56) References Cited

U.S. PATENT DOCUMENTS

| 3,782,591 A | * | 1/1974 | Fries ........................... 221/213 |
| 3,834,290 A | * | 9/1974 | Nelson ........................ 93/93 C |
| 4,624,616 A | * | 11/1986 | Freese ........................ 414/129 |
| 4,964,782 A | * | 10/1990 | DeCrane ................... 414/798.1 |
| 5,197,849 A | * | 3/1993 | Tubke ......................... 414/788 |
| 5,567,102 A | * | 10/1996 | Tanaka ........................ 414/274 |
| 5,674,048 A | * | 10/1997 | Rich ......................... 414/797.5 |
| 6,139,254 A | * | 10/2000 | Ouellette ................. 414/797.4 |

FOREIGN PATENT DOCUMENTS

GB 2224498 A * 9/1990

\* cited by examiner

Primary Examiner—Dean J. Kramer
Assistant Examiner—Michael Lowe
(74) Attorney, Agent, or Firm—Thompson Coburn LLP

(57) ABSTRACT

A pallet dispenser can receive a vertical stack of skewed or misaligned pallets in an interior of a frame of the pallet dispenser and align the pallets as they are sequentially dispensed from the pallet dispenser onto a conveyor below the pallet dispenser. The pallet dispenser that can be quickly manually changed over to accommodate pallets of different sizes and vertically dispense the pallets one by one onto a conveyor below the pallet dispenser. The pallet dispenser is provided with a quick, manual change over that enables the pallet dispenser to be quickly adjusted to accommodate a vertical stack of large or small pallets to be reoriented and dispensed by the pallet dispenser onto a separate conveyor without appreciable downtime of the pallet dispenser or the conveyor with which it is used.

28 Claims, 5 Drawing Sheets

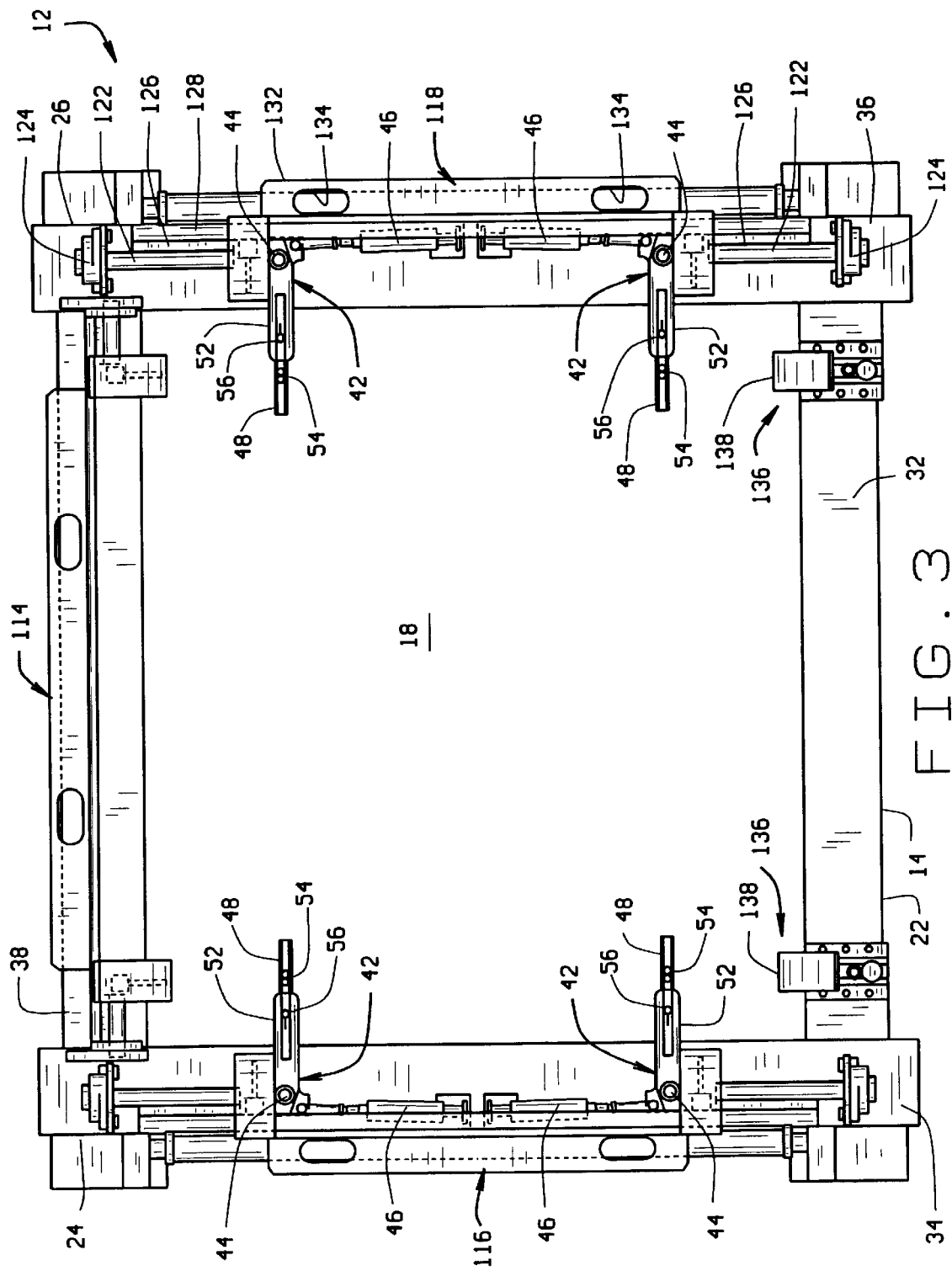

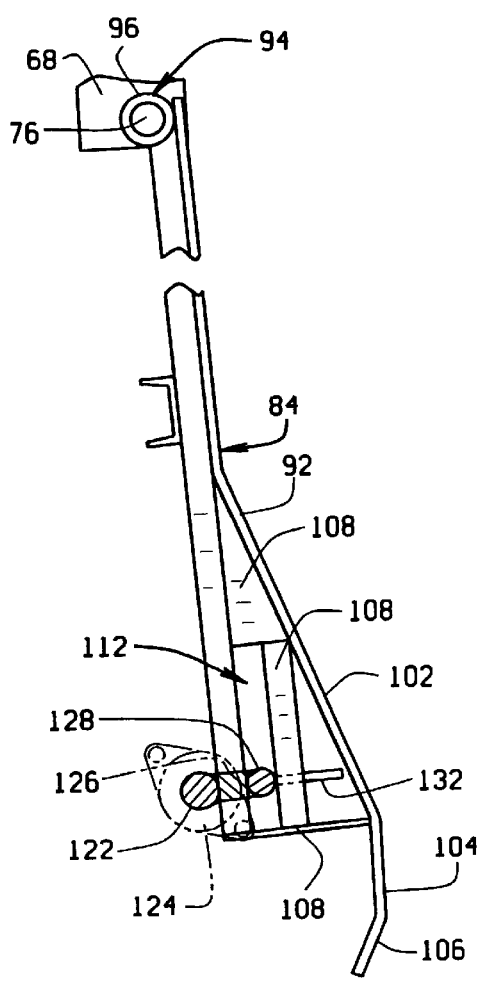 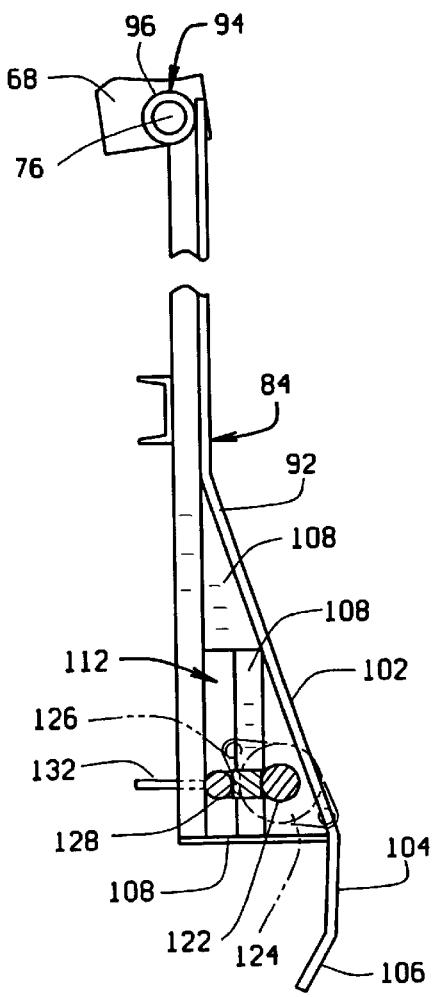
FIG. 4A    FIG. 4B
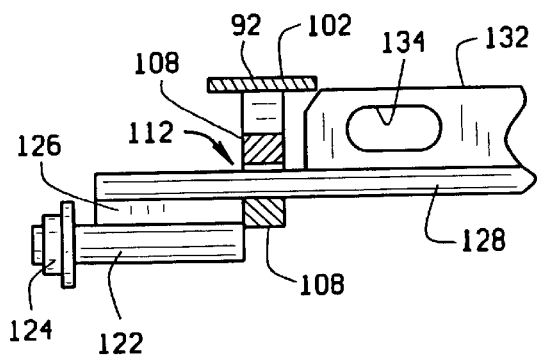 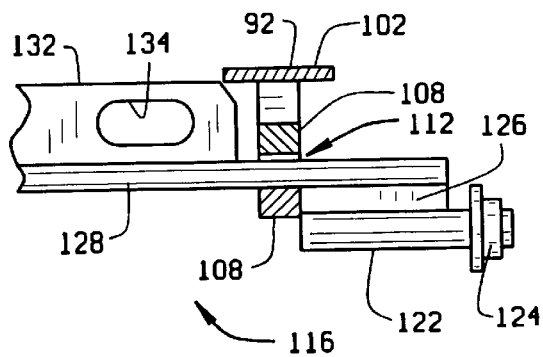
FIG. 5A

PALLET DISPENSER WITH QUICK PALLET SIZE CHANGE OVER

BACKGROUND OF THE INVENTION

1. Field of the Invention

The present invention pertains to a pallet dispenser that can receive a vertical stack of skewed or misaligned pallets in an interior of the pallet dispenser and align the pallets as they are sequentially dispensed from the pallet dispenser onto a conveyor below the pallet dispenser. More specifically, the present invention pertains to a pallet dispenser that can be quickly manually changed over to accommodate pallets of different sizes and vertically dispense the pallets one by one onto a conveyor below the pallet dispenser.

2. Description of the Related Art

There are many different known types and sizes of pallet constructions that are employed in supporting goods when being shipped. The pallets are designed to be lifted by conventional forklift trucks and provide a base for large goods or for large numbers of goods that would be difficult to be manually lifted and transported. By supporting large, heavy goods or large numbers of goods on a pallet, the goods can be easily transported, for example from a loading dock to a truck bed or vice versa, by a conventional forklift truck.

Most conventional pallets are constructed of wood and/or plastic and are intended to be reused several times. Emptied pallets that are to be reused are usually stacked upon each other in a storage area until they are needed. Often the stacking of the used pallets is done manually as the pallets are emptied, resulting in skewing or misalignment of the vertically stacked pallets in many instances. What is meant by skewing or misalignment is that the sides of the pallets in the vertical stack are not aligned and adjacent pallets are staggered or slightly turned relative to each other.

In pallet dispensers that are employed in combination with conveyor systems, the skewing or misalignment of pallets loaded into the pallet dispenser must be corrected before the dispenser dispenses a pallet onto the conveyor system. This is necessary so that the pallets dispensed onto the conveyor system are properly oriented relative to the conveyors so that goods to be loaded onto the pallets conveyed by the conveyor system are properly positioned on the pallets. For example, in an automated conveyor system that stacks layers of rows of goods on a pallet conveyed through the system, the pallet must first be correctly oriented relative to the conveyor in order to ensure that the layers of rows of goods are properly positioned on the pallet.

To achieve the proper orienting of the pallets dispensed from a pallet dispenser onto a conveyor system, prior art pallet dispensers typically had guide rails at their opposite sides and their fronts and backs that would engage the four sides of a pallet as it is dispensed from a vertical stack of pallets positioned in the interior of the pallet dispenser. The guide rails would engage with the four sides of the pallets as they are dispensed vertically downward through the pallet dispenser and orient the bottom most pallet of the stack just prior to its being dispensed onto the conveyor system below the dispenser.

However, pallets are manufactured in a variety of sizes and primarily in a large size that measures 56" by 44" and a small size that measures 48" by 40". If a stack of small pallets is loaded into a pallet dispenser whose guide rails have been previously adjusted and set to reorient a stack of large pallets, the guide rails of the pallet dispenser would have to be manually adjusted to reorient the small pallets of the stack of pallets loaded into the pallet dispenser. Additionally, if a stack of large pallets is to be loaded into a pallet dispenser that had been previously adjusted to dispense a stack of small pallets, the guide rails of the pallet dispenser would have to be manually adjusted and reset in order to first receive the stack of large pallets in the interior of the pallet dispenser and then to properly orient the large pallets as they are dispensed from the pallet dispenser. Because prior art pallet dispensers typically would have guide rails on all four sides of the dispenser to engage all four sides of the pallets dispensed vertically downward through the dispenser, adjusting the positions of guide rails to accommodate stacks of different size pallets would require a considerable amount of labor time. This labor time was not only down time for the pallet dispenser as its guide rails are adjusted, but also down time for the entire conveyor system as the system waits for additional pallets to be dispensed by the pallet dispenser. This down time significantly decreases the cost efficiency of running a conveyor system.

Furthermore, large pallets and small pallets differ in their construction in that the cross beams of the pallets that are spatially arranged between the top and bottom panels of the pallets or the top and bottom sheets or boards of the pallets usually have a different spacing between the beams. The prior art pallet dispensers would have actuator arms that would project horizontally into the interior volume of the pallet extending between the cross beams of the bottom most pallet of the stack and thereby support the vertical stack of pallets in the pallet dispenser interior. Retracting the actuator arms would cause the bottom most pallet to be dispensed downwardly onto the conveyor, a portion of which would typically be raised to receive the bottom most pallet. As the portion of the conveyor is lowered after receiving the bottom most pallet, the actuator arms would again be extended into the pallet dispenser interior to engage between the crossbeams of the next pallet of the stack and support the stack of pallets in the pallet dispenser interior as the previously dispensed pallet is lowered and conveyed out of the dispenser. Because large and small pallets have different numbers of cross beams that have different positions in the pallets, it would also be necessary to adjust the length of the actuator arms when the pallet dispenser is to be changed over from dispensing large pallets to dispensing small pallets, or vice versa.

What is needed to overcome the disadvantages associated with prior art pallet dispensers is a way of quickly changing over the pallet dispenser to accommodate vertical stacks of pallets of different sizes.

SUMMARY OF THE INVENTION

Much of the construction of the pallet dispenser of the invention is similar to that of prior art pallet dispensers and therefor is not described in detail. The pallet dispenser is basically comprised of a rectangular base that is dimensioned to support both large and small pallets in an interior area of the base above a conveyor apparatus with which the dispenser is used. The conveyer is not part of the invention but a typical conveyor employed with pallet dispensers has a portion positioned beneath the pallet dispenser that raises to accept a pallet at a bottom of a vertical stack of pallets supported by the dispenser and then lowers incrementally to enable the pallet dispenser to engage with the next pallet above the pallet on the conveyor so that the pallet on the conveyor can be separated from the remainder of the pallets in the vertical stack supported in the interior of the pallet dispenser.

The bottom most pallet is separated from the remainder of the pallets in the vertical stack by actuator arms of the dispenser supported on the base. The actuators of the actuator arms cause the arms to swing out from the base through an arc to positions where they project inwardly from opposite sides of the base toward the base interior. As the arms are actuated and swing out through the arc of movement, they pass between the top and bottom panels of the pallet to be engaged by the arms and in between cross beams of the pallet. However, because the pallet dispenser of the invention is designed to dispense both large and small pallets, the actuator arms of the dispenser are modified. The modification is necessary because longer actuator arms needed to reach into the pallet dispenser interior a sufficient distance to engage with smaller pallets would likely engage with cross beams of larger pallets loaded into the pallet dispenser interior before they complete their arc of movement. To avoid this problem, the actuator arms of the invention are constructed in two parts that are connected to each other for linear sliding movement between at least two adjusted lengths of the actuator arms. A manually operated pin holds the actuator arms in their two adjusted length positions. In this manner, the lengths of the actuator arms can be increased to engage small pallets stacked in the pallet dispenser and the lengths of the actuator arms can be decreased to engage large pallets stacked in the pallet dispenser.

A frame of the pallet dispenser extends upwardly from a top of the base. The frame has an interior positioned above the base interior and is dimensioned sufficiently large to receive a vertical stack of large pallets in the frame interior. The frame supports vertical upright assemblies at the opposite left and right sides of the pallet dispenser and supports a rear vertical upright assembly at the rear of the pallet dispenser. The front of the frame is basically left open to provide sufficient access for a forklift truck to deposit a stack of pallets into the frame interior through the front of the frame.

Each of the left and right vertical upright assemblies and the rear upright assembly is comprised of a pair of rails that are suspended from pivot connections of the rails at the top of the frame. Each pair of rails hangs downwardly through the frame interior to bottom portions of the rails that are angled inwardly toward the frame interior. The pairs of rails are designed to guide pallets in a vertical stack toward the center of the pallet dispenser base as pallets are sequentially dispensed vertically downward through the frame interior. The inwardly angled portions of the rails at their bottom ends orient the lower pallets of the stack in their desired position relative to the conveyor with which the dispenser is used just prior to the pallets being dispensed onto the conveyor.

Each of the vertical upright assemblies is provided with a manual handle that is used to move the vertical upright assemblies between first and second adjusted positions of the assemblies relative to the frame. In the first positions of the vertical upright assemblies, their rails are moved inwardly toward the frame interior. In their first positions, the left and right side vertical uprights and the rear vertical uprights guide a stack of small pallets vertically downward through the frame interior. The inwardly angled lower portions of the rails of the upright assemblies orient the bottom most pallet of the stack of small pallets in its desired orientation prior to being deposited onto the conveyor beneath the dispenser. When the manual handles of the vertical upright assemblies are moved toward their second positions, the rails of the vertical upright assemblies are moved outwardly away from the frame interior to their second positions. In the second positions of the rails, the lower portions of the rails orient the bottom most pallet in a stack of large pallets in its desired position prior to being dispensed onto the conveyor below the dispenser.

The manual handles of each of the vertical upright assemblies are basically comprised of pivot shafts at opposite sides of the assemblies that are mounted in bushings on the dispenser base and horizontal rods that are mounted to the shafts at opposite ends of the rods. A manual hand hold is mounted to each rod intermediate its opposite ends. The shafts provide a pivoting connection of the rods and the hand holds to the base that pivots about a horizontal axis of the shafts. By gripping the hand holds, the rods can be pivoted about the shafts and moved through an arc toward the frame interior to first positions of the manual handles and away from the frame interior to second positions of the handles. The opposite ends of the rods engage in vertical slots of the pair of rails of the vertical upright assemblies for sliding movement of the rod ends through the slots as the rods are moved through an arc between their first and second positions. Moving the rods to their first positions causes the vertical upright assemblies to move to their first positions relative to the frame, and moving the rods to their second positions causes the vertical upright assemblies to move to their second positions relative to the frame. In this manner, the manual handles provide a mechanism by which the positioning of the vertical upright assemblies can be easily and quickly adjusted between their first and second positions in a very small amount of time.

A pair of guides are mounted to the base at the front of the frame for linear sliding movement toward and a away from the frame interior. The guides have angled orientations similar to those of the lower inwardly angled positions of the rails of the vertical upright assemblies. The guides at the front of the dispenser assembly are much shorter than the suspended rails of the vertical upright assemblies enabling a forklift truck to lift a stack of pallets over the guides and then deposit the stack of pallets downwardly into the dispenser interior. The guides are each mounted for sliding movement between first and second positions relative to the base of the dispenser. The guides have pins that can be pulled manually out from the guides to disengage the guides from the base enabling them to be moved between their first and second positions and then the pins are dropped into a corresponding hole in the guide slide that holds the guide in its adjusted position. Again, by providing the sliding connections of the guides to the base and the pins that hold the guides in their adjusted positions, the guides can be quickly and easily adjusted between their first and second positions relative to the pallet dispenser base.

The pallet dispenser assembly described above provides quick and easy adjustments of the vertical uprights and guides of the pallet dispenser to enable it to receive large or small pallets and quickly adjust to accommodate the pallets so that the pallets are properly oriented relative to a conveyor with which the dispenser is used prior to the dispenser assembly dispensing the pallet onto the conveyor.

BRIEF DESCRIPTION OF THE DRAWINGS

Further features of the invention are revealed in the following detailed description of the preferred embodiment of the invention and in the drawing figures wherein:

FIG. 3 is a top plan view of the base of the pallet dispenser with the frame removed;

FIGS. 4A and 4B show relative positions of the manual handle and one of the rails of a vertical upright assembly of the invention when in their first and second adjusted position;

FIGS. 5A and 5B show the relative positions of a manual handle and the rails of one of the vertical upright assemblies when moved between their first and second positions.

DETAILED DESCRIPTION OF THE PREFERRED EMBODIMENT

Figure 1:
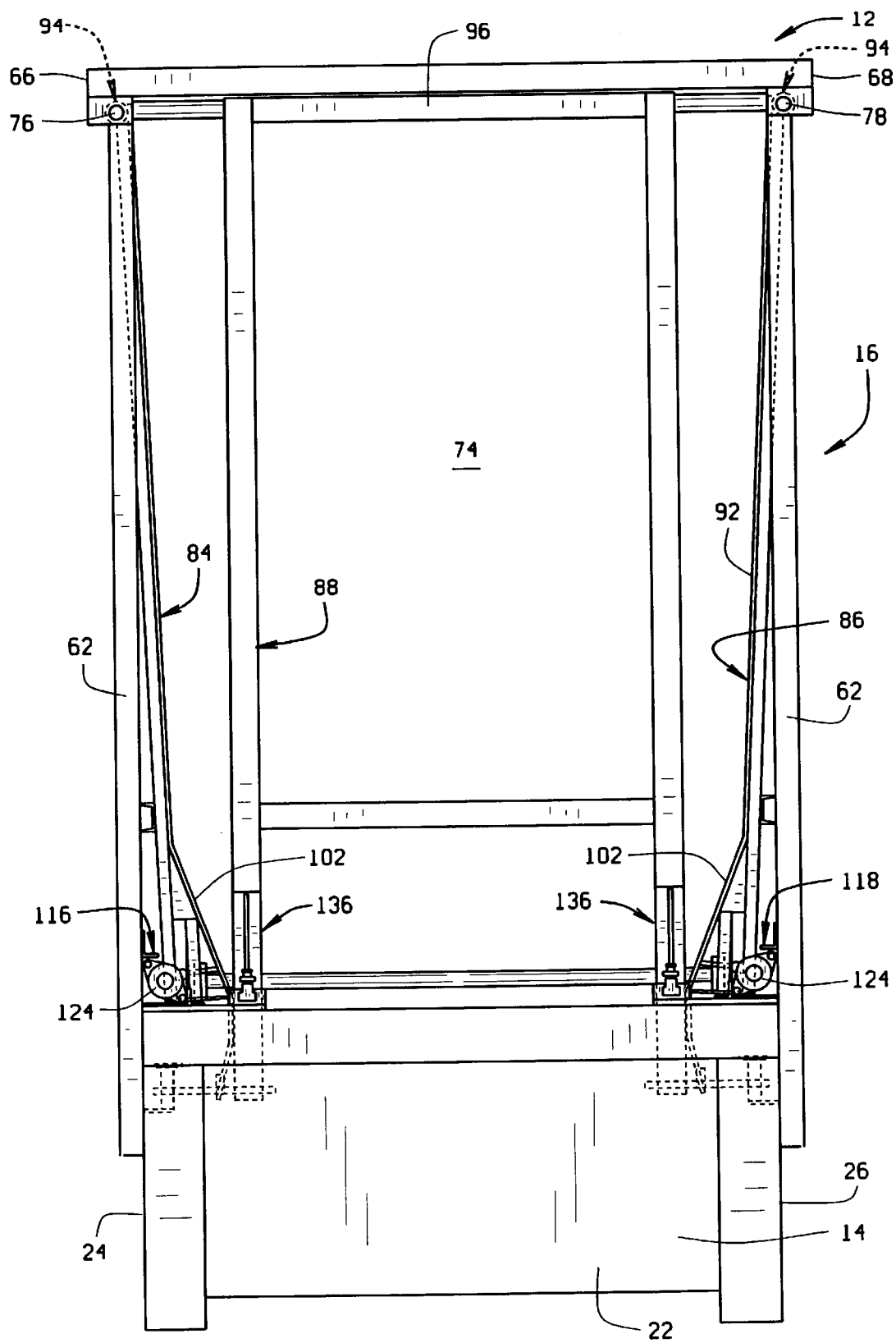
FIG. 1 is a front elevation view of the pallet dispenser of the assembly.
Figure 2:
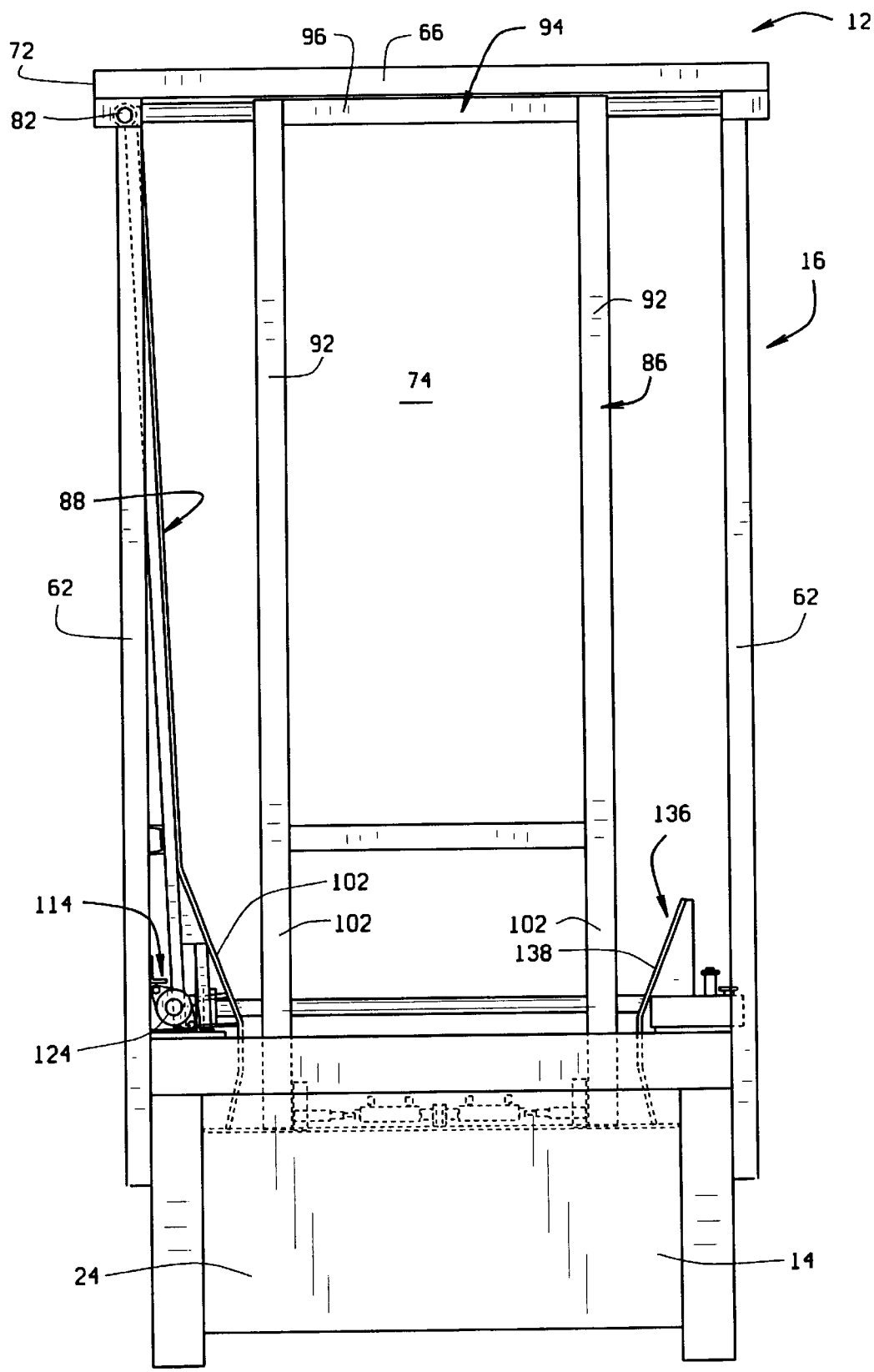
FIG. 2 is a left side elevation view of the pallet dispenser of the invention.

FIGS. 1 through 3 shows the pallet dispenser 12 of the present invention. The pallet dispenser is basically comprised of a base 14 at the bottom of the dispenser which supports a vertical stack of pallets placed in the dispenser, for example by a forklift truck, and a frame 16 mounted on the top of the base that receives the vertical stack of pallets in its interior. Much of the construction of the base 14 and the frame 16 of the invention is employed in prior art pallet dispensers and these known structural features will be described generally. In the preferred embodiment both the base 14 and the frame 16 are primarily constructed of metal parts to provide strength and rigidity to the pallet dispenser enabling it to accommodate a large vertical stack of pallets.

The base 14 is shown from its top in FIG. 3 with the frame 16 removed for clarity. The base 14 is constructed in a rectangular configuration that is larger than the largest pallet to be received by the pallet dispenser. As seen in FIGS. 1 and 2, the base 14 has a vertical height sufficient to accommodate the end of a conveyor (not shown) in the base interior 18 where the conveyor will receive a pallet dispensed by the dispenser. The base of this example of a pallet dispenser is comprised of a front 22 and left 24 and right 26 side walls. The back of a base is left open to accommodate the conveyor (not shown). On the top of the base are four cross beams that define the bottom of the frame 16. These include a front cross beam 32, a left side cross beam 34, a right side cross beam 36 and a rear cross beam 38.

Mounted on the bottom cross beams of the frame are the actuators of the pallet dispenser. Four actuators are employed on the pallet dispenser and each has basically the same construction. The actuators include actuator arms 42 that are mounted in pairs by vertical pivot connections 44 to the opposite bottom left and right cross beams 34, 36 of the frame. Each of the actuator arms 42 is constructed like a bell crank and is connected to a piston/cylinder actuator 46 on one side of its pivot connection 44. The actuator arms 42 extend outwardly toward the base interior 18 when the piston/cylinder actuators 46 are retracted and are pivoted through an arc and extend substantially parallel with the piston/cylinder actuators when the actuators are extended. Each actuator arm 42 is constructed with a first part 48 and a second part 52 that are connected together for linear sliding movement of the two parts relative to each other. For example, the arm second parts 52 are formed with a groove having an inverted T-shape and the arm first parts 48 are formed with a complementary configuration that is received in the groove of the second part. This enables the arm first parts 48 to slide relative to the arm second parts 52 between at least first and second adjusted lengths of the actuator arms 42. In FIG. 3 the arms are shown adjusted to their first lengths. Adjusting the arms to their second lengths involves sliding the arm first part 48 through its sliding connection with the arm second part 52 provided by the groove in the second part. The top surfaces of the arm's first parts 48 are provided with holes 54 and the arm's second parts are provided with spring biased pin detents 56 that can be manually retracted from the holes 54 of the second parts 52 to enable the first parts 48 to be manually slid into the second parts to their second adjusted position. Releasing the detent pin 56 causes it to be received in one of the adjustment holes 54 of the arm's first parts securing the arm in its second, shorter adjusted length. In this manner, the actuator arms 42 can be quickly and easily adjusted in length to accommodate or support smaller pallets in their first, longer adjusted lengths shown in FIG. 3 or to accommodate or support larger pallets in their second, shorter adjusted lengths.

The frame 16 also includes columns 62 that extend upwardly from the bottom cross beams of the frame to the top cross beams of the frame. The top cross beams include left 66 and right 68 cross beams and a rear cross beam 72. The frame also includes gussets and cross braces to add to the strength and rigidity of the frame, but to simplify the drawing figures only the four corner columns and the three top cross beams are shown in the drawings. The columns and cross beams define the interior 74 of the frame that is dimensioned sufficiently large to receive a vertical stack of skewed or misaligned large pallets therein. Supported on the top cross beams at the top of the dispenser frame is a left side pivot shaft 76, a right side pivot shaft 78 and a rear pivot shaft 82. Suspended for pivoting movement from the three pivot shafts are three vertical upright assemblies including a left side assembly 84, a right side assembly 86 and a rear assembly 88. Each of the vertical upright assemblies is substantially the same and therefore only the left side vertical upright assembly 84 will be described in detail.

The left side vertical upright assembly 84 is comprised of a pair of rails 92 that are suspended from pivot connections 94 at the top ends of the rails from the left side pivot shaft 76 at the top of the frame. The pivot connections 94 could be provided by bearings or bushing connections between the rails and the pivot shaft or, as in this embodiment, can be provided by merely a round, tubular member 96 through which the pivot shaft 76 extends. Spacers or collars could be mounted on opposite sides of the round, tubular member 96 on the pivot shaft 76 to maintain the vertical upright assembly 84 in its position axially on the shaft. Each of the rails 92 are preferably an L-shaped or T-shaped cross section with a flat surface facing toward the interior 74 of the frame. This provides a smooth sliding surface for pallets stacked in the frame interior as they are dispensed vertically downward through the frame as will be described. The bottom ends of the rails 92 are formed with inwardly angled portions 102 as shown in FIGS. 4A and 4B. At the bottommost ends of the rails they are first formed with flats 104 and then outwardly angled portions 106. In the area of the inwardly angled portion 102, the rail flat 104 and the outwardly angled portion 106, the guide rail is reinforced with several metal plates 108 that define a vertical slot 112 behind the inwardly angled portion 102 of the guide rail. The slot 112 is employed in pivoting the guide rails 92 about their pivot connections to the pivot shafts 76, 78, 82 to move the guide rails between first and second adjusted positions relative to the frame interior 74 as will be explained.

Operatively connecting the frame bottom cross beams at the rear 38 and left 34 and right 36 sides of the frame are manual pivot handle assemblies 114, 116, 118. Each of the manual handle assemblies is substantially the same and therefore only the left side manual handle assembly 116 will be described in detail. The left side manual handle assembly 116 is shown in FIGS. 3 through 5. It is comprised of two horizontally oriented stub shafts 122 at its opposite ends that are mounted by bearings 124 to the left side bottom cross beam 34 of the frame. The stub shafts 122 have a coaxial center axis and the bushings 124 mount the shafts for rotation about the horizontal center axis of the shaft. Spacers 126 are secured to each of the stub shafts 122 and a rod 128 is secured to the spacers at its opposite ends. The rod 128 passes through the vertical slots 112 of the pair of rails 92 of the left side vertical upright assembly 84. A hand hold 132 comprised of a plate with two hand openings 134 as secured to the rod 128 between the rails 92 of the left side vertical upright assembly. The pair of bearings 124 mount the manual handle assembly 116 to the bottom left cross beam 34 of the frame for pivoting movement of the handle assembly through an arc over the stub shafts 122 between first and second positions of the handle assembly. The operative connections between the handle assemblies 114, 116, 118 and their respective vertical upright assemblies 88, 84, 86 causes the upright assemblies to move between their first and second positions relative to the frame interior 74 in response to the handle assemblies being moved between their first and second positions as will be explained.

Figure 6:
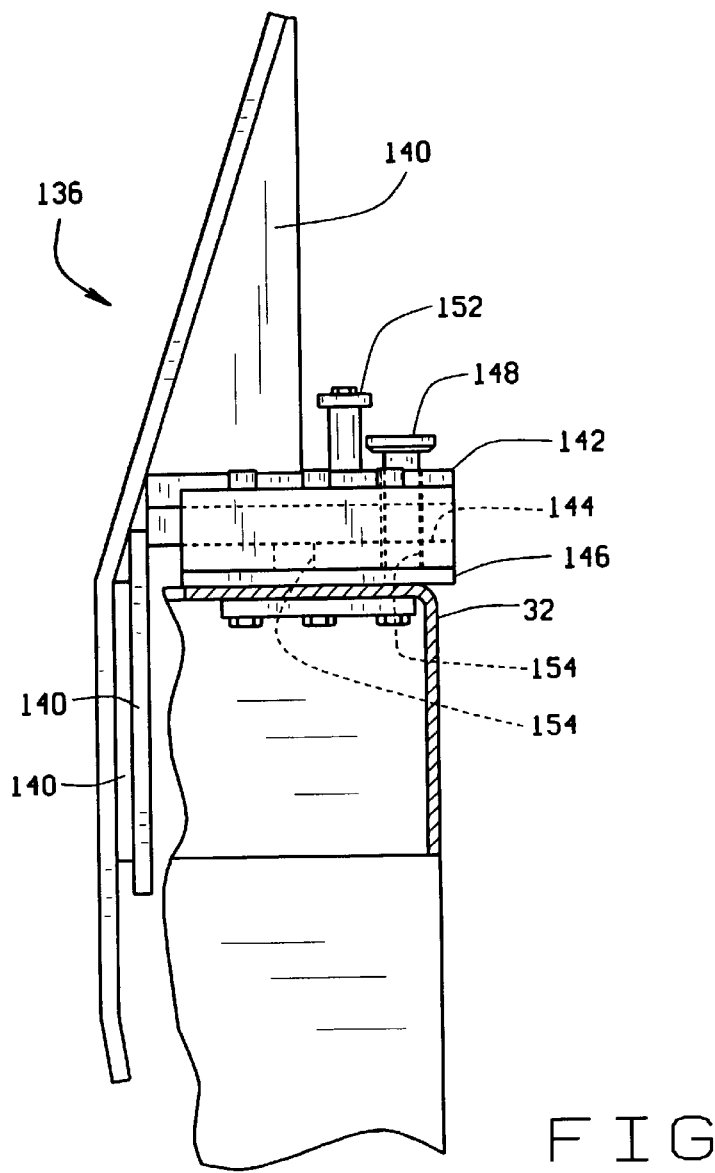
FIG. 6 is a partial side elevation view of one of the guides of the dispenser assembly.

FIGS. 1, 3 and 6 show additional upright assemblies 136 that are mounted to the bottom front cross beam 32 of the frame. These additional upright assemblies 136 are basically constructed as guides 138 having angled orientations that angle inwardly similar to the inwardly angled portions 102 of the first through third vertical upright assemblies. The angled guides 138 provide smooth surfaces for pallets in a vertical stack of pallets in the frame interior 74 to slide downwardly against. They are connected by several reinforcing plates 140 to slide blocks 142 that have an inverted T-shape similar to that of the actuator arm first parts 48. The slide blocks 142 are received for sliding movement in complementary inverted T-shaped grooves 144 formed in base members 146 of the guide assemblies that are mounted to the front bottom cross beam 32 of the frame. This connection between the slide blocks 142 and the guide bases 146 enables the blocks and their attached guides 138 to slide, linearly toward and away from the frame interior 74 between first and second adjusted positions of the guides relative to the frame interior. Pins 148 are mounted for upward and downward movement in the slide blocks 142 with the upward movement being limited by a stop 152 mounted to the top of the slide block. Holes 154 complementary to the pins 148 are provided in the bottom of the slot 144. The pin holes 154 receive the pins 148 when the guides 138 are moved to their first and second adjusted positions relative to the frame interior 74 to hold the guides in their adjusted positions.

FIGS. 1 and 2 show the vertical upright assemblies 84, 86, 88 and the guides 138 in their second adjusted positions relative to the frame interior 74. In these positions the horizontal spacing between the rail flats 104 of the uprights and the guides 138 is set to properly orient a large pallet, i.e., a pallet of 56 inches by 44 inches, loaded into the pallet dispenser interior 74 by a fork lift prior to the pallet being dispensed by the pallet dispenser. Thus, the spacing between the rail flats 104 of the left and right upright assemblies 84, 86 is slightly larger than 56 inches. Also, the horizontal space between the rail flats 104 of the rear upright assembly 88 and the guides 138 at the front of the frame is slightly larger than 44 inches. With the vertical upright assemblies 84, 86, 88 and the guides 138 adjusted to their second relative positions to the frame shown in FIGS. 1 and 2, the pallet dispenser is adjusted to receive a vertical stack of large pallets and to properly orient pallets at the bottom of the stack as they are dispensed through the pallet dispenser and prior to their being deposited onto a conveyor.

Figure 5B:
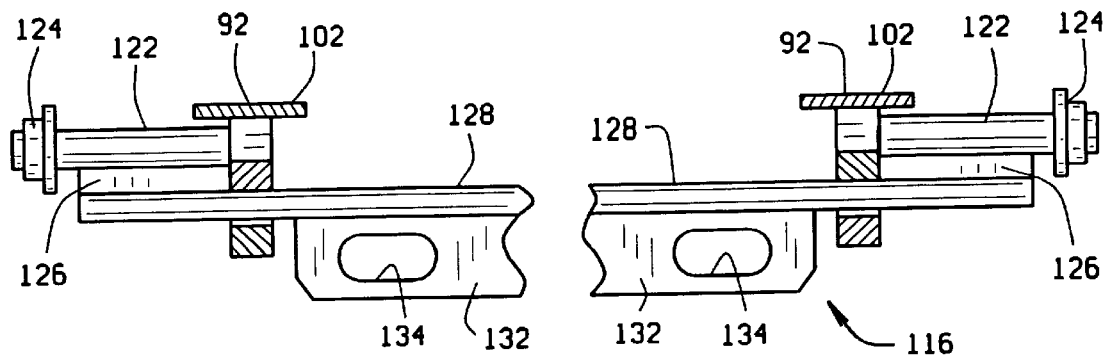

To adjust the pallet dispenser vertical upright assemblies and guides from their second positions shown in FIGS. 1 and 2 to their first positions for dispensing smaller pallets, the manual handle assemblies 114, 116, 118 are moved from their second positions shown in FIG. 4B and FIG. 5B to their first positions shown in FIGS. 4A and 5A. The manual handle assemblies are moved by gripping the hand openings 134 of the hand holes 132 and then rotating the handle assembly through an arc segment around the center horizontal axis of the stub shafts 122. This causes the rods 128 of the handle assemblies to move through an arc over the stub shafts 122 and slide along the lengths of the slots 112 of the upright assemblies 84, 86, 88. This in turn causes the upright assemblies to pivot about their pivot connections 94 inwardly toward the frame interior 74 to their first positions in the frame interior. When moved to their first positions the rail flats 104 of the left 84 and right 86 vertical upright assemblies are positioned horizontally apart slightly larger than the 48 inches of a small, 48×40 inch pallet. In addition, the pins 148 of the guides 138 at the front of the dispenser base are pulled upwardly from their pin holes 154 and the guides are slid inwardly toward the frame interior 74 to their first positions where the pins 148 will align with the pin holes 154 that correspond to the guide first positions. The pins are dropped into these pin holes securing the guides in place. With the guides 138 adjusted to their first positions and the rear vertical upright assembly 88 previously adjusted to its first position the spacing between the flats 104 of the rear vertical upright assembly and the guides 138 is slightly larger than the 40 inch dimension of the smaller pallet.

In the manner discussed above, the vertical upright assemblies and the guides of the pallet dispenser can be quickly and easily manually adjusted between their first and second positions relative to the dispenser frame 16 to accommodate a stack of small or large pallets to be dispensed by the dispenser without appreciable downtime of the pallet dispenser or the conveyor system with which it is used. In addition, the actuator arms 42 of the dispenser can be quickly and easily manually adjusted between their first and second lengths to accommodate a vertical stack of small or large pallets to be dispensed by the dispenser.

While the present invention has been described by reference to a specific embodiment, it should be understood that modifications and variations of the invention may be constructed without departing from the scope of the invention defined in the following claims.

What is claimed:

1. A pallet dispensing apparatus comprising:
   a frame having an interior that is dimensioned to receive a stack of pallets therein;
   first and second vertical uprights supported in the frame interior by pivot connections between the uprights and the frame, the first and second vertical uprights each having means to move the first and second uprights toward each other into the frame interior to a first relative position of the uprights where a first spacing between the uprights is sufficient to permit a pallet to be dispensed downwardly in the frame interior between the uprights and to move the first and second uprights away from each other and the frame interior to a second relative position of the uprights where a second spacing between the uprights is sufficient to permit a pallet to be dispensed downwardly in the frame interior between the uprights, the second spacing being greater than the first spacing.

2. The pallet dispensing apparatus of claim 1, wherein:

the first and second vertical uprights are suspended hanging downwardly from the pivot connections between the uprights and the frame.

3. The pallet dispensing apparatus of claim 1, wherein:

an additional vertical upright is mounted on the frame between the first and second vertical uprights by a sliding connection between the additional upright and the frame that enables the additional upright to slide linearly toward and away from the frame interior between first and second positions of the additional upright relative to the frame.

4. The pallet dispensing apparatus of claim 1, wherein:

first and second dispenser arms are mounted on the frame on opposite sides of the frame interior for movement between first and second positions of the dispenser arms relative to the frame where in the first positions the dispenser arms project into the frame interior and in the second positions the dispenser arms are retracted out of the frame interior, and the first and second arms have lengths that are adjustable between at least first and second lengths where the first lengths of the dispenser arms are longer than the second lengths.

5. The pallet dispensing apparatus of claim 4, wherein:

each of the first and second dispenser arms has two parts that are connected by a sliding connection for sliding movement of the two parts between the first and second lengths of the arms.

6. A pallet dispensing apparatus comprising:

a frame having an interior that is dimensioned to receive a stack of pallets therein;

first and second vertical uprights supported in the frame interior by pivot connections between the uprights and the frame that enable the first and second uprights to be pivoted toward each other into the frame interior to a first relative position of the uprights and to be pivoted away from each other and the frame interior to a second relative position of the uprights; and the first and second vertical uprights each have a manual handle that is mounted to the frame for movement between first and second positions of the handle relative to the frame, and each of the first and second vertical uprights is operatively connected to its handle whereby each of the first and second vertical uprights is moved to its first and second positions in response to its handle being moved to its first and second positions.

7. The pallet dispensing apparatus of claim 6, wherein:

each of the manual handles has at least one shaft that is mounted to the frame for pivoting movement about a horizontal shaft axis of the shaft as the handle is moved between its first and second positions.

8. The pallet dispensing apparatus of claim 7, wherein:

the first and second vertical uprights are connected to the frame by pivot connections that have pivot axes that are parallel to the shaft axes of the manual handles.

9. The pallet dispensing apparatus of claim 8, wherein:

the first and second vertical uprights each have a slot in the upright and each manual handle has a rod that projects from the handle and engages in the slot for sliding movement of the rod in the slot as the manual handle is moved between its first and second positions.

10. The pallet dispensing apparatus of claim 9, wherein:

the first and second vertical uprights are suspended in the frame interior by their pivot connections to the frame.

11. A pallet dispensing apparatus comprising:

a frame having an interior that is dimensioned to receive a stack of pallets therein;

first and second vertical uprights supported in the frame interior by pivot connections between the uprights and the frame that enable the first and second uprights to be pivoted toward each other into the frame Interior to a first relative position of the uprights and to be pivoted away from each other and the frame interior to a second relative position of the uprights; and a third vertical upright is supported in the frame interior between the first and second vertical uprights by a pivot connection between the third upright and the frame that enables the third upright to pivot into the frame interior to a first position of the third vertical upright relative to the frame and to pivot away from the frame interior to a second position of the third vertical upright relative to the frame.

12. The pallet dispensing apparatus of claim 11, wherein;

the third vertical upright is suspended by hanging downwardly from the pivot connection between the third upright and the frame.

13. A pallet dispensing apparatus comprising:

a frame having an interior that is dimensioned to receive a vertical stack of pallets therein, the frame supporting first and second vertical uprights on opposite sides of the frame interior for movement of the first and second vertical uprights between first and second relative positions, in the first positions the uprights are moved toward each other reducing a space between the uprights in the frame interior whereby a stack of small pallets can be placed in the frame interior between the uprights where the uprights will reorient pallets in the stack as pallets are dispensed downwardly through the frame interior and in the second positions the uprights are moved away from each other increasing a space between the uprights in the frame interior whereby a stack of large pallets can be placed in the frame interior between the uprights where the uprights will reorient pallets in the stack as pallets are dispensed downwardly through the frame interior; and, the frame has a top and the first and second vertical uprights are suspended from pivot connections of the first and second vertical uprights to the frame top.

14. The pallet dispensing apparatus of claim 13, wherein:

the frame supports a third vertical upright at a rear of the frame that is positioned between the opposite sides of the frame, the third vertical upright is supported on the frame for movement of the third vertical upright between first and second relative positions, in the first position the third vertical upright is moved toward the first and second vertical uprights and the frame interior and in the second position the third vertical upright is moved away from the first and second vertical uprights and the frame interior.

15. The pallet dispensing apparatus of claim 14, wherein:

the frame supports a fourth vertical upright at a front of the frame on an opposite side of the frame interior from the rear of the frame and between the opposite sides of the frame, the fourth vertical upright is supported on the frame for movement between first and second relative positions of the fourth vertical upright, in the first position the fourth vertical upright is moved toward the first, second and third vertical uprights and the frame interior and in the second position the fourth vertical upright is moved away from the first, second and third vertical uprights and the frame interior.

16. The pallet dispensing apparatus of claim 15, wherein:

the fourth vertical upright is supported on the frame by a linear sliding connection of the fourth vertical upright to the frame.

17. The pallet dispensing apparatus of claim 13, wherein:

the first, second and third vertical uprights are suspended from pivot connections of the first, second and third vertical uprights to the frame top.

18. A pallet dispensing apparatus comprising:

a frame having an interior that is dimensioned to receive a stack of pallets therein;

first and second dispensing arms mounted on the frame on opposite sides of the frame interior for movement of the dispensing arms between first and second positions relative to the frame interior where in the first positions the dispensing arms project into the frame interior where they will engage with a pallet of a stack of pallets placed in the frame interior and vertically support the engaged pallet and any pallets stacked on the engaged pallet and in the second positions the dispensing arms are retracted out of the frame interior where they will not engage with a pallet of a stack of pallets placed in the frame interior and will allow a stack of pallets placed in the frame interior to moved downwardly through the frame interior, the first and second dispenser arms having adjustable lengths that are adjustable between at least first and second lenths of the dispenser arms, where in the first lengths the dispenser arms are longer than when the dispenser arms are in their second lengths.

19. The pallet dispensing apparatus of claim 18, wherein:

the dispensing arms are manually adjustable between their first and second lengths.

20. The pallet dispensing apparatus of claim 19, wherein:

each of the first and second dispenser arms has two parts that are connected to each other for sliding movement between the first and second lengths of the arms.

21. A pallet dispensing apparatus comprising:

a frame having an interior that is dimensioned to receive a vertical stack of pallets therein, the frame supporting first and second vertical uprights on opposite sides of the frame interior for movement of the first and second vertical uprights between first and second relative positions, in the first positions the uprights are moved toward each other reducing a space between the uprights in the frame interior whereby a stack of small pallets can be placed in the frame interior between the uprights where the uprights will reorient pallets in the stack as pallets are dispensed downwardly through the frame interior and in the second positions the uprights are moved away from each other increasing a space between the uprights in the frame interior whereby a stack of large pallets can be placed in the frame interior between the uprights where the uprights will reorient pallets in the stack as pallets are dispensed downwardly through the frame interior; and first and second dispensing arms are mounted on the frame on opposite sides of the frame interior for movement between first and second positions of the dispensing arms relative to the frame where in the first positions the dispensing arms project into the frame interior where they will engage with a pallet of a stack of pallets placed in the frame interior and vertically support the engaged pallet and any pallets stacked on the engaged pallet and in the second positions the dispensing arms are retracted out of the frame interior where they will not engage with a pallet of a stack of pallets placed in the frame interior and will allow a pallet placed in the frame interior to move downwardly through the frame interior, the first and second dispenser arms having lengths that are adjustable between at least first and second lengths, where in their first lengths the dispenser arms are longer than when the dispenser arms are in their second lengths.

22. The pallet dispensing apparatus of claim 21, wherein:

the first and second dispenser arms are manually adjustable between their first and second lengths.

23. The pallet dispensing apparatus of claim 22, wherein:

each of the first and second dispenser arms has two parts that are connected to each other for sliding movement between the first and second lengths of the arms.

24. The pallet dispensing apparatus of claim 23, wherein:

the first and second vertical uprights each have a manual handle that is mounted to the frame for movement between first and second positions of the handle relative to the frame, and each of the first and second vertical uprights is operatively connected to its handle whereby each of the first and second vertical uprights is moved to its first and second positions in response to its handle being moved to its first and second positions.

25. The pallet dispensing apparatus of claim 24, wherein:

each of the manual handles has at least one shaft that is mounted to the frame for pivoting movement about a horizontal shaft axis of the shaft as the handle is moved between its first and second positions.

26. The pallet dispensing apparatus of claim 25, wherein:

the first and second vertical uprights are connected to the frame by pivot connections that have pivot axes that are parallel to the shaft axes of the manual handles.

27. The pallet dispensing apparatus of claim 26, wherein:

the first and second vertical uprights each have a slot in the upright and each manual handle has a rod that projects from the handle and engages in the slot for sliding movement of the rod in the slot as the manual handle is moved between its first and second positions.

28. The pallet dispensing apparatus of claim 27, wherein:

the first and second vertical uprights are suspended in the frame interior by their pivot connections to the frame.

* * * * *